United States Patent [19]

Kinjo

[11] Patent Number: 4,633,357
[45] Date of Patent: Dec. 30, 1986

[54] TUBULAR RECORDING MEDIUM HAVING A FLEXIBLE MAGNETIC RECORDING SURFACE

[75] Inventor: Hisao Kinjo, Yokohama, Japan

[73] Assignee: Victor Company of Japan Ltd., Yokohama, Japan

[21] Appl. No.: 454,649

[22] Filed: Dec. 30, 1982

[30] Foreign Application Priority Data

Jan. 10, 1982 [JP] Japan ................................. 57-2089
Mar. 1, 1982 [JP] Japan ................................ 57-31945

[51] Int. Cl.$^4$ .............................................. G11B 5/76
[52] U.S. Cl. ..................................... 360/136; 360/137
[58] Field of Search ................. 360/87, 131, 136, 132; 346/138; 369/260, 258

[56] References Cited

U.S. PATENT DOCUMENTS

| 3,001,850 | 9/1961 | Marrs | 360/136 |
| 3,029,416 | 4/1962 | Quade | 360/102 |
| 3,390,385 | 6/1968 | Ehalt | 346/138 |
| 3,478,339 | 11/1969 | Lichowsky | 360/119 |

FOREIGN PATENT DOCUMENTS

| 1185837 | 1/1965 | Fed. Rep. of Germany . |
| 736158 | 9/1955 | United Kingdom . |
| 778112 | 7/1957 | United Kingdom . |
| 857328 | 12/1960 | United Kingdom . |
| 1040023 | 8/1966 | United Kingdom . |

OTHER PUBLICATIONS

IBM Technical Disclosure Bulletin, vol. 13, No. 11, Apr. 1971.
IBM Technical Disclosure Bulletin, vol. 19, No. 8, Jan. 1977.

Primary Examiner—John H. Wolff
Assistant Examiner—Andrew L. Sniezek
Attorney, Agent, or Firm—Roberts, Spiecens & Cohen

[57] ABSTRACT

A recording medium operative with a recording and/or reproducing apparatus comprising a rotational motor and recording and/or reproducing transducer. The recording medium comprises a main body including a flexible recording carrier in the form of a sheet or film, and a support member supporting one end of the main body to maintain a circular shape for the body and being engageable with the motor. The recording carrier has a hollow cylindrical-shape and is provided with an opening at the end remote from the support member. The carrier has a recording surface around its periphery and a hollow interior with a surface which is parallel to the outer peripheral surface. The recording medium is rotated by the motor while maintaining a predetermined minute gap between the main body and a rotation stabilizing member which has a cylindrical surface substantially parallel to the main body.

18 Claims, 31 Drawing Figures

TUBULAR RECORDING MEDIUM HAVING A FLEXIBLE MAGNETIC RECORDING SURFACE

BACKGROUND OF THE INVENTION

The present invention generally relates to cylindrical and flexible recording mediums for recording and/or reproducing apparatuses, and more particularly to a hollow and substantially cylindrical-shaped flexible recording medium suitable for use in an image pickup recording and/or reproducing apparatus such as a so-called electronic camera.

Recently, in addition to efforts for reducing the size of a video signal magnetic recording and reproducing apparatus (so-called video tape recorder, and hereinafter simply referred to as a VTR), attempts have been made to reduce the size of an image pickup camera by combining a solid-state pickup element such as a charge coupled device (CCD) with integrated circuit (IC) technology. That is, a compact and light-weight apparatus referred to as an electronic 8 mm device, unitarily comprising the VTR and the camera, has been proposed.

The above electronic 8 mm device has an advantage over the so-called conventional 8 mm movie camera using an optical 8 mm film, in that the picked up and recorded information can be reproduced on a television receiver immediately after the recording. In addition, the above electronic 8 mm device employs a magnetic tape using a metal-particle type magnetic material formed by an improved magentic layer forming technique, and a metal type head, to realize a greater recording density compared to the recording density of the conventional VTR, and the overall size of the whole device is reduced. The electronic 8 mm device essentially employs the recording and reproducing principle of a helical scan type VTR using a magnetic tape and rotary heads. Accordingly, although the electronic 8 mm device can carry out uninterrupted recording of moving pictures, without replacing once loaded roll of medium, longer than that of the 8 mm movie camera, the electronic 8 mm device has the following disadvantages.

(1) Normal recording of the moving pictures can be carried out, but so-called still-picture-frame recording in units of fields or frames cannot be carried out.

(2) In relation to paragraph (1) above, recording in terms of picture frames wherein some randomly selected frames are replaced by new frames, and a random access reproduction, cannot be carried out.

(3) A rotary drum provided with video heads, a tape loading mechanism for drawing out the tape from a tape cassette and loading the tape unto a predetermined tape path, a tape travel driving mechanism for causing the tape to travel through the predetermined tape path, and the like, are essential to the electronic 8 mm device, and it is difficult to achieve substantial reduction in size and weight of the mechanical structure.

(4) The limit of the track pitch upon high density recording is in the order of 20 $\mu$m from the practical point of view because the tape slightly deviates upwards and downwards while traveling on the tape path, and there is a limit in the size reduction of the electronic 8 mm device due to the fact that fine quality recording and reproduction cannot be maintained if the track pitch is further reduced.

(5) It is difficult to obtain tracking by swinging technology of the rotary heads.

On the other hand, a so-called electronic camera which records the video signal onto a single side of a flexible magnetic disc, has been proposed as a potential replacement of the still picture camera using an optical 35 mm film. In this electronic camera, a magnetic disc having a diameter in the order of 35 mm, for example, is rotated at a rotational speed of 3600 rpm within a main camera body having a size in the range of a normal 35 mm single-lens reflex camera. The video signal obtained by picking up an image by a solid-state pickup element such as a CCD is recorded magnetically onto the magnetic disc by a magnetic head. The magnetic head carries out recording in terms of one field for one revolution of the magnetic disc, and is successively moved along the radial direction of the magnetic disc. However, this electronic camera also suffers the following disadvantages.

(a) Because the magnetic disc is used as a recording medium and the picture of one picture frame is recorded for one revolution of the magnetic disc, the magnetic disc is rotated at a constant angular speed. Hence, the relative linear speed between the magnetic head and the magnetic disc becomes smaller towards the inner periphery of the magnetic disc. Thus, in order to carry out recording in a normal manner, the central area of the magnetic disc is unusable and wasted, and the recording range is accordingly limited. On the other hand, there is a limit to the diameter of the magnetic disc because the size of the main camera body is limited. Therefore, the effective recording area of the magnetic disc cannot be made large, and the recording capacity thus cannot be made large.

(b) In relation to paragraph (a) above, the picture quality of the recorded picture becomes poor towards innermost part of the disc whereat the relative linear speed between the magnetic head and the magnetic disc is small.

(c) A standing wave is likely to be introduced at the outermost periphery of the rotating magnetic disc because the magnetic disc comprises a flexible magnetic sheet such as a floppy disc. Hence, a flutter phenomenon may be observed on the magnetic disc due to the above standing wave, and the magnetic head cannot make stable contact with the magnetic disc. As a result, the outermost peripheral part of the disc which is most usable desirable for picture quality whereat the relative linear speed between the magnetic head and the magnetic disc is large, cannot be utilized.

On the other hand, a concept was conventionally known to construct a recording and reproducing apparatus which uses a cylindrical-shaped rotary magnetic drum as a magnetic recording medium mostly for computers. In this apparatus which uses the magnetic drum, the relative linear speed between the magnetic head and the magnetic drum is constant regardless of the position of the magnetic head. However, the size of the recording and reproducing apparatus becomes large, because the recording capacity of the magnetic drum is not as large as the magentic tape, and the size and volume of the magnetic drum is large. In addition, the handling of the magnetic drum is troublesome since the entire cylindrical surface of the magnetic drum is magnetic. Moreover, it is difficult to manufacture a magnetic drum comprising a good quality uniform magnetic surface. Therefore, the magnetic recording and reproducing aparatus using the magnetic drum was not reduced to practice for consumer products.

Accordingly, the present inventor has previously proposed a recording medium having a hollow substantially cylindrical-shape and opening at one end thereof, which is designed so that a driving motor of the image pickup recording and/or reproducing apparatus relatively enters within the hollow part of the recording medium, in a U.S. patent application entitled RECORDING MEDIUM FOR RECORDING AND/OR REPRODUCING APPARATUS. This recording medium can easily be confined within a main apparatus body having a size in the range of a conventional 35 mm single-lens reflex camera, for example. In addition, the relative linear speed between a recording and reproducing transducer and the recording medium is substantially constant regardless of the position of the recording and reproducing transducer on the recording medium. Thus, a reproduced picture of uniform quality can be maintained throughout the entire recording surface of the recording medium. Furthermore, the recording capacity of this recording medium is larger compared to the previously described magnetic disc, if the available recording area of the medium is taken into account.

However, this previously proposed recording medium is designed so that the other end thereof on the opposite side of the open end is closed. The closed end of the recording medium engages with a rotary shaft of the motor, and the recording medium is rotated through this engagement. Hence, if there is eccentricity or vibration of the axis of rotation at the engaging part of the recording medium and the rotary shaft of the motor, this eccentricity or vibration will be amplified at the open end of the recording medium. Thus, there is a problem in that stable recording and reproduction is difficult to achieve at parts in the vicinity of the open end of the recording medium.

In order to eliminate the above described problem, a double-bearing design was devised for axially supporting the recording medium at both ends thereof, by also providing a bearing at a part in the vicinity of the open end of the recording medium. However, such a design is disadvantageous in that the structure becomes complex.

Accordingly, it is highly desired to realize a recording medium having a hollow cylindrical-shape of a simple construction, which can be rotated stably throughout the entire recording and reproducing range of the recording medium without introducing eccentricity or vibration of the axis of rotation.

In addition, when the recording medium is formed from metal or synthetic resin and the like, the peripheral surface of the recording medium must be finished to a smooth cylindrical surface. Furthermore, the cylindrical peripheral surface of the recording medium must be covered with a magnetic film, through a process such as vacuum deposition, ion plating, sputtering, or plating. For this reason, there is a problem in that the manufacturing cost becomes high.

SUMMARY OF THE INVENTION

Accordingly, it is a general object of the present invention to provide a novel and useful cylindrical and flexible recording medium, in which the above described problems have been eliminated and the demands satisified.

Another and more specific object of the present invention is to provide a recording medium suited for use in the so-called electronic camera type image pickup recording and/or reproducing apparatus, which is capable of obtaining a satisfactory cylindrical recording surface by effectively suppressing surface fluctuation in the substantially cylindrical-shaped recording surface of the recording medium. The recording medium rotates in a state where a rotation stabilizing member is inserted into a hollow part of the recording medium and a minute gap is formed between the recording medium and the rotation stabilizing member. Fluctuation in the cylindrical surface of the recording medium is damped by the viscous drag of an air layer within the minute gap between the recording medium and the rotation stabilizing member, and the recording medium thus rotates stably. Fluctuation is not introduced in the cylindrical recording surface of the recording medium even when a magnetic head makes contact with the recording surface, to ensure stable recording and reproduction. According to the recording medium of the present invention, the cylindrical recording surface obtained is stable comprising no eccentricity in the rotational axis and no surface fluctuation.

Still another object of the present invention is to provide a recording medium for recording and/or reproducing apparatus, comprising a magnetic tube recording surface obtained by forming a flexible magnetic film or magnetic sheet into a tubular shape, and designed so that the recording medium rotates in a state where a rotation stabilizing member is inserted within a hollow part thereof. According to the recording medium of the present invention, the recording surface assumes a stable tubular surface due to centrifugal force, and the recording surface becomes an even more stable tubular surface by the cooperation of the rotation stabilizing member.

Other objects and further features of the present invention will be apparent from the following detailed description when read in conjunction with the accompanying drawings.

DETAILED DESCRIPTION

Figure 1:
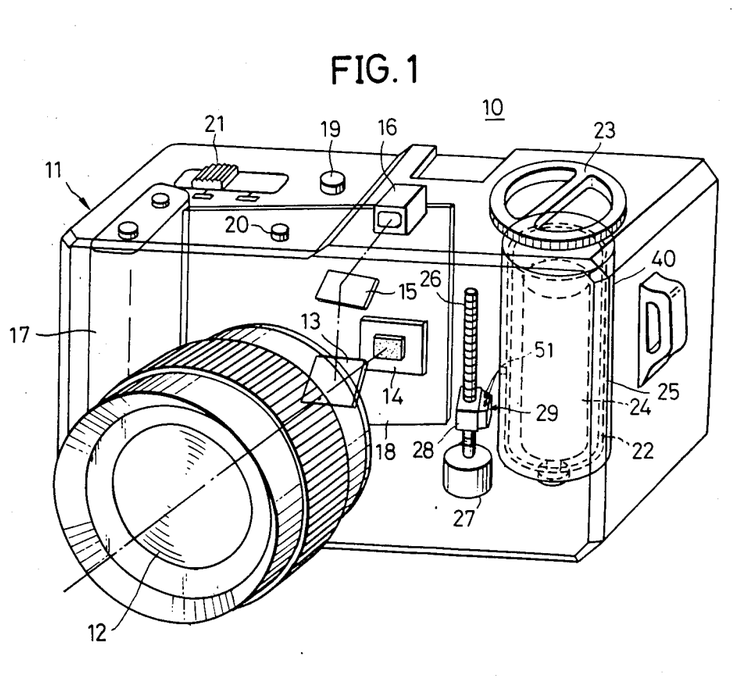
FIG. 1 is a perspective view showing an embodiment of an image pickup recording and/or reproducing apparatus which is loaded with a recording medium according to the present invention.

First, general description will be given with respect to an embodiment of an image pickup recording and/or reproducing apparatus with respect to which a recording medium according to the present invention is used. An image pickup recording and/or reproducing apparatus 10 comprises an external frame 11 which has a shape generally similar to a 35 mm single-lens reflex camera. Although the external frame 11 is shown in a perspective view as a transparent frame for convenience' sake in order to explain the inner construction thereof, the external frame 11 is actually opaque. Light from an object (not shown) which is to be image picked up and recorded passes through a lens system 12 and a half mirror 13, and is then projected to a solid-state pickup element 14 comprising a CCD, for example. The light thus projected to the pickup element 14 is converted into a video signal. A part of the light which is passed through the lens system 12 is reflected at the half mirror 13 to reach a view finder 16 after being further reflected at a mirror 15. A battery 17 is a power source to a printed circuit device 18 provided with the image pickup element 14, a motors 24 and 27 which will be described hereinafter, and the like. Similarly as in a normal camera, a shutter button 19, a release button 20, and an operation switch 21 are provided on the upper surface of the external frame 11.

A magnetic drum 22 is loaded into or unloaded from a drive assembly 40 within the apparatus 10, by opening a lid 23. The magnetic drum 22 is hollow cylindrical-shape, and the motor 24 and a rotation stabilizing member 25 are relatively inserted within the magnetic drum 22 in its loaded state, as will be described hereinafter. A feed screw 26 is rotated by the motor 27. A feed nut 28 is screwed onto the feed screw 26, and a magnetic head device 29 is mounted on the nut 28. The magnetic head device 29 moves upwards or downwards as the feed screw 26 rotates.

Figure 2:
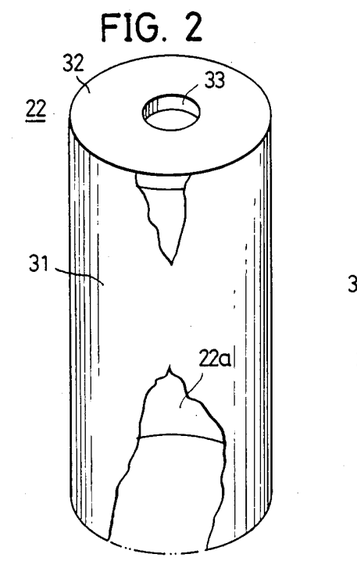
FIG. 2 is a perspective view, with a part cut away, showing a magnetic drum part of a first embodiment of a recording medium according to the present invention.

A first embodiment of a magnetic drum 22 has a shape shown in FIG. 2. The magnetic drum 22 is of a hollow cylindrical-shape comprising a hollow part 22a which has an open lower end, and comprises a magnetic tube 31 having a thin and flexible magnetic film or magnetic sheet of a tubular shape, and a disc-shaped end plate 32 acting as a support member fixedly fitted at a top end of the magnetic tube 31. The end plate 32 comprises a mounting hole 33 at a center thereof. As one method of fixing the end plate 32 onto the magnetic tube 31, the end plate 32 may be adhered onto the magnetic tube 31 by a binding agent, for example. Further, a ring (not shown) may be fitted over the external surface at the top end of the magnetic tube 31 after the end plate 32 is fitted into the inner surface at the top end of the magnetic tube 31, and the end plate 32 may be fixed onto the magnetic tube 31 by fixing the ring on the end plate 32 by a screw and the like.

When taking into consideration the fact that the size of the external frame of the apparatus 10 shown in FIG. 1 is to be in the range of the existing 35 mm optical camera, the size of the magnetic drum 22 is set in the range of a patronat of the existing 35 mm film (47 mm in length and 25 mm in diameter) or in the range of a patronat case which accommodates the above patronat (53 mm in length, 31 mm in case diameter, and 34 mm in cap diameter).

On the other hand, in the portable type VTR for home use which is presently most popular throughout the world, the diameter of a drum provided with two rotary heads is selected to 62 mm, and the rotational speed of the drum is selected to 30 rps. Thus, the relative linear speed between the magnetic tape and the heads is selected to 5.8 m/sec. Fine quality recording and reproduction of the video signal is realized by selecting the relative linear speed between the magnetic recording medium and the heads to the above value.

As a preferable embodiment, if the relative linear speed between the magnetic tube 31 of the magnetic drum 22 and a magnetic head 51 is selected to 5.8 m/sec, the diameter and the rotational speed of the magnetic tube 31 are respectively set to 31 mm and 60 rps. In addition, if the length of the magnetic tube 31 is selected in the range of 50 mm, the size as a whole can be set to a size substantially the same as that of the patronat case of the 35 mm film.

If the diameter and rotational speed of the magnetic tube 31 are respectively selected to 31 mm and 60 rps (3600 rpm), the relative linear speed of 5.8 m/sec is obtained between the magnetic tube 31 and the magnetic head 51. Thus, one field of the television video signal which is picked up, can be recorded for one revolution of the magnetic tube 31. Moreover, because the diameter of the magnetic tube 31 is substantially the same throughout the entire length of the magnetic tube 31 (50 mm of length in the above example), the relative linear speed is maintained same, and the recording and reproduction can effectively be carried out with the same performance characteristic throughout the entire length of the magnetic tube 31. If an electronic tracking technique is applied with respect to the magnetic head 51, the recording and reproduction may be carried out on a narrow track wherein the track width is 3 $\mu$m and the guard band is 1.5 $\mu$m (track pitch of 4.5 $\mu$m), for example. Accordingly, if the moving range of the magnetic head 51 with respect to the magnetic tube 31 having a length of 50 mm is selected to 48.6 mm, for example, 48.6 mm/4.5 $\mu$m=10800 tracks can be formed on the magnetic tube 31. Therefore, when recording and reproducing still pictures, more than 10,000 picture frames of still pictures can be recorded and reproduced. On the other hand, when continuously recording and reproducing motion pictures to carry out normal recording and reproduction, 10,800/60×60=3, that is, three minutes of full-field normal recording and reproduction can be carried out. If a so-called field-skip recording is carried out wherein the recording is carried out for every second field, six minutes of recording and reproduction can be carried out because there are thirty picture frames per second in this case.

The magnetic tube 31 comprises a film formed with a magnetic film on the surface of a sheet of macromolecular material having a thickness in the range of 20 $\mu$m to 200 $\mu$m, and is flexible. The magnetic film may be formed by any method such as coating, deposition, sputtering, ion plating, electroless plating, or electroplating.

As one method of manufacturing the magnetic tube 31, an inflation method may be employed. According to this method, air is injected into a melted polyethylene terephthalate to extract the polyethylene terephthalate in a tubular shape, and the tube of polyethylene terephthalate film is then taken up in a roll. The taken up polyethylene terephthalate tube is in turn fitted over a cylinder as being unwound from the roll, and the polyethylene terephthalate film shrinks and adheres onto the cylinder when heated. Then a magnetic layer is formed over the tube thus formed. A magnetic tube 31 of a seamless tubular-shape can accordingly be obtained by cutting the tube into predetermined lengths while extracting the cylinder out of the thus formed tube.

Figure 3:
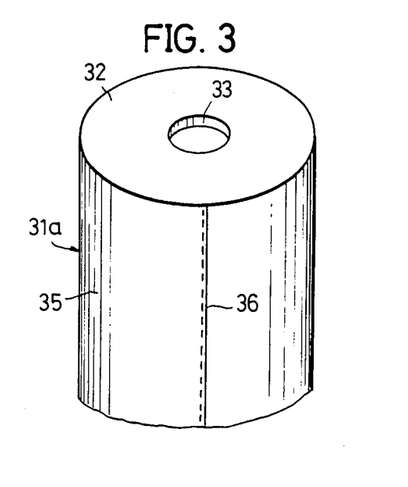
FIGS. 3 and 4 are perspective views respectively showing a part of an example of a magnetic tube constructed according to a manufacturing method of a magnetic tube of the magnetic drum shown in FIG. 2.

As another example of the method of manufacturing the magnetic tube, a magnetic film or magnetic sheet 35 is bent in a cylindrical-shape and both end edges thereof are adhered together at an overlapping part 36 to form a magnetic tube 31a shown in FIG. 3. In this case, it is desirable to cut both the end edges of the magnetic sheet 35 meet each other obliquely in the cross section, and adhere the obliquely cut end edge parts which overlap so that the thickness of the magnetic sheet 35 at the overlapping part is maintained flush with the other parts.

Figure 4:
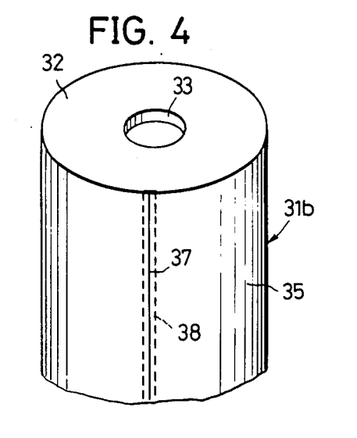

Furthermore, both the end edges of the magnetic film or magnetic sheet 35 may be brought face to face at a part 37 as shown in FIG. 4, to form a magnetic tube 31b by adhering parts in the vicinity of both the end edges from the rear surface of the magnetic sheet 35 by an exceedingly thin adhesive tape 38.

In the magnetic tubes 31a and 31b shown in FIGS. 3 and 4, the magnetic film or magnetic sheet 35 is discontinuous at the parts 36 and 37. Accordingly, dropout is introduced in the recorded and reproduced signals at these parts 36 and 37. Hence, when using such a magnetic tube, it is desirable to rotationally control the magnetic drum so that a vertical blanking period of the video signal resides at these parts 36 and 37. The vertical blanking period of the video signal does not appear in the reproduced picture, and in addition, a vertical synchronizing signal which is dropped out may be restored electrically by an electrical circuit.

Moreover, in the magnetic tubes 31a and 31b shown in FIGS. 3 and 4, it sometimes is difficult in practice to cut both the end edges of the magnetic sheet 35 where the end edges meet at the parts 36 and 37, so that the length of the magnetic sheet between the end edges becomes perfectly the same as the circumference of the end plate 32. In such a case, the magnetic sheet 35 is cut so that the length of the magnetic sheet 35 between the end edges becomes slightly shorter than the circumference of the end plate 32, and the magnetic sheet 35 is wound slightly helical so that both the end edges meet completely face to face. In this state, the parts 36 and 37 do not become parallel with respect to the axis of the magnetic tube but oblique, however this causes no problems in operation.

Figure 5:
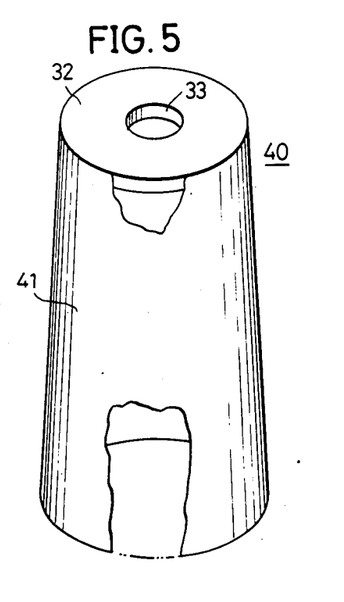
FIG. 5 is a perspective view, with a part cut away, showing another embodiment of a magnetic drum.

The magnetic tube of the magnetic drum need not be a right cylindrical-shape as shown in FIG. 2, and may be a truncated cone shape such as a magnetic tube 41 of the magnetic drum 40 as shown in FIG. 5. In this case, it is desirable for the difference between the diameter at the upper end part of the magnetic tube 41 and the diameter at the lower end part of the magnetic tube 41 to be small, because the difference between circumferential rotational speeds at the upper and lower end parts of the magnetic tube 41 becomes large if the difference between diameters at the upper and lower end parts of the magnetic tube 41 is large.

Figure 6:
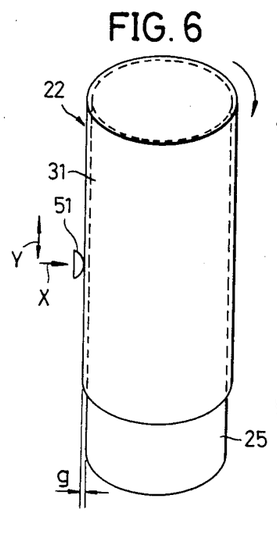
FIG. 6 is a diagram for explaining the operating principle of the relation between the magnetic drum and a rotation stabilizing member.

Next, the operating principle of the magnetic drum will be described in conjunction with FIG. 6. The magnetic drum 22 is rotated in a state where the rotation stabilizing member 25 is inserted within the hollow part 22a thereof. A gap g between the magnetic tube 31 of the magnetic drum 22 and the stationary rotation stabilizing member 25 is set to a minute gap in the range of 10 $\mu$m to 200 $\mu$m, for example.

When the magnetic drum 22 is rotated at a high speed of 60 rps in the above state, for example, tension is introduced in the flexible magnetic tube 31, and the magnetic tube 31 rotates in a state where a perfectly cylindrical surface is formed. In addition, because the magnetic tube 31 is rotated at the high speed, an air film (layer) which rotates under viscous drag between the magnetic tube 31, is formed in the gap g between the magnetic tube 31 and the rotation stabilizing member 25. If the gap g is too large, the above rotating air film (layer) is not formed effectively. Hence, in such a case, a damping effect which will be described hereinafter is not obtained. On the other hand, if the gap g is too small, the magnetic tube 31 sticks to the rotation stabilizing member 25 due to static electricity and does not rotate smoothly. For these reasons, it is desirable to select the value of the gap g within the above described range.

When the magnetic head 51 moved in the direction of an arrow X to make contact with the outer surface of the magnetic tube 31 with a predetermined pressure and moved in the direction of an arrow Y to carry out recording or reproduction, forces are introduced to cause surface oscillation in the surface of the magnetic tube 31. However, these forces are cancelled by the effective damping provided by the viscous drag of the air film formed in the gap g. Accordingly, swells due to deformation, standing wave, and the like, are not introduced in the surface of the magnetic tube 31. As a result, the magnetic tube 31 constantly rotates maintaining a stable cylindrical surface, even when the magnetic head 51 is making contact therewith. According to the experimental data obtained by the present inventor, it has been confirmed that the magnetic tube 31 will rotate maintaining a satisfactory and stable cylindrical surface, if the diameter and length of the magnetic tube 31 are 31 mm and 50 mm, respectively, the magnetic film for forming the magnetic tube 31 is a polyester film having a thickness of 30 $\mu$m and formed with a magnetic film, the magnetic tube 31 is rotated at a rotational speed of 60 rps, and the depression quantity of the magnetic head 51 with respect to the surface of the magnetic tube 31 is in the range of 10 $\mu$m to 20 $\mu$m.

Figure 7:
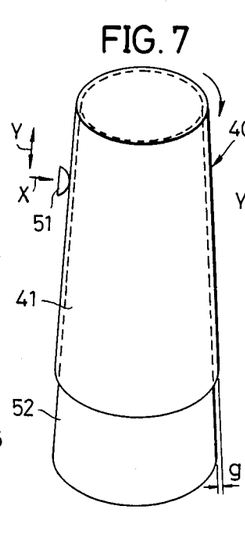
FIGS. 7 and 8 respectively are diagrams for explaining other embodiments of relations between the magnetic drum and the rotation stabilizing member.

With respect to a magnetic drum 40 of the truncated cone shape shown in FIG. 5, a rotation stabilizing member 52 of a truncated cone shape is employed. This rotation stabilizing member 52 is inserted into the magnetic tube 41, to form a gap g between the magnetic tube 41 and the rotation stabilizing member 52 throughout the entire surface of the magnetic tube 41, as in the case of the above described rotation stabilizing member 25. In this case, the magnetic tube 41 rotates maintaining a stable conical surface when the magnetic drum 40 is rotated at a high speed, due to the centrifugal force and the air film in the gap g.

Figure 8:
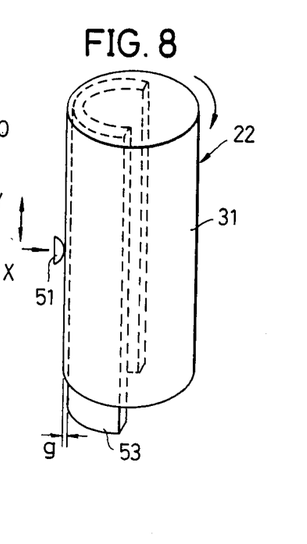

It is desirable for the rotation stabilizing member to be formed throughout the entire surface of the magnetic tube as in the rotation stabilizing member 25 (or 52), but the rotation stabilizing member may be formed as a rotation stabilizing member 53 shown in FIG. 8, for example. The rotation stabilizing member 53 has a radius of curvature greater than that of the magnetic tube 31, and is of a halved cylindrical-shape not opposing the entire surface of the magnetic tube 31 but only partially opposing the surface of the magnetic tube 31. At a part where the rotation stabilizing member 53 opposes the magnetic head 51 through the magnetic tube 31, the gap between the magnetic tube 31 and the rotation stabilizing member 53 becomes a minimum and equal to the gap g described before, and the rotation stabilizing member 53 is separated from the magnetic tube 31 at the other parts.

When the magnetic drum 22 is rotated at a high speed, air enters from one end of the rotation stabilizing member 53 and leaves from the other end through the gap g, as the magnetic tube 31 rotates. Hence, an air film (layer) is similarly formed in the gap g, and the magnetic head 51 stably makes contact with the peripheral surface of the magnetic tube 31.

Figure 9:
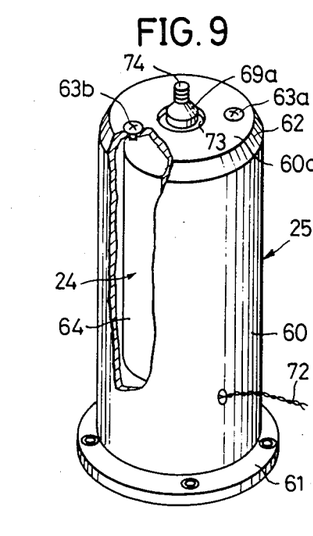
FIG. 9 is a perspective view, with a part cut away, showing an embodiment of a rotation stabilizing member.
Figure 10:
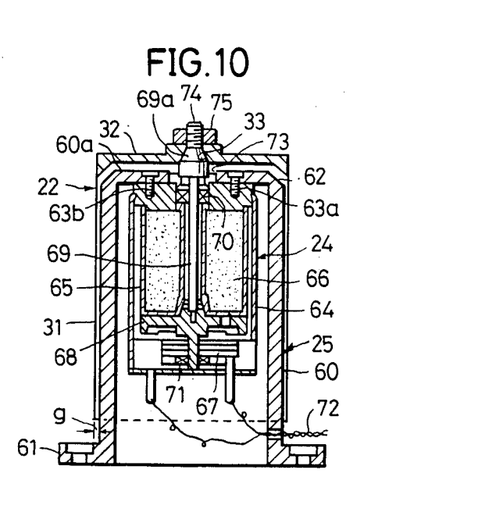
FIG. 10 is an elevation, in vertical cross section, showing a state where the magnetic drum is loaded onto the rotation stabilizing member shown in FIG. 9.

A concrete embodiment of the rotation stabilizing member 25 will now be described in conjunction with FIGS. 9 and 10. The rotation stabilizing member 25 comprises a hollow cylindrical body 60 having an outer diameter such that the previously described gap g is formed in a state where the rotation stabilizing member 25 is relatively inserted within the magnetic tube 31 of the magnetic drum 22. The cylindrical body 60 comprises a flange 61 at a lower end thereof for being mounted on a base plate of a recording and/or reproducing apparatus. A tapered surface 62 is formed at an upper part of the cylindrical body 60, to guide the magnetic tube 31 so that the magnetic tube 31 can be smoothly and relatively fitted over the rotation stabilizing member 25.

The motor 24 is inserted within the hollow part of the cylindrical body 60, and fixedly supported on a ceiling part 60a by screws 63a and 63b. D.C. motors such as an inner rotor motor, outer rotor motor, cup motor, Hall element motor, print motor, and brushless motor, may be used as the motor 24. In the present embodiment of the invention, the motor 24 is a coreless type D.C. motor, and comprises a rotor coil 65 accommodated within a motor casing 64, a field magnet 66, a brush 67, and a rotary shaft 69 mounted with the rotor coil 65 and unitarily rotatable with a rotary body 68. The rotary shaft 69 is axially supported by bearings 70 and 71 mounted on the motor casing 64. The brush 67 is supplied with a D.C. current through a lead wire 72.

An upper end part 69a of the rotary shaft 69 penetrates through a hole 73 in the ceiling part 60a of the cylindrical body 60, and projects upwards. The upper end part 69a of the rotary shaft 69 is formed in the shape of a truncated cone, and comprises a screw part 74. The hole 33 in the end plate 32 of the magnetic drum 22 fits over the upper end part 69a. The end plate 32 is restricted to a height position by the tapered surface of the upper end part 69a such that the end plate 32 is separated from the ceiling part 60a, and also restricted of a position corresponding to the center of rotation. The magnetic drum 22 is mounted onto the rotary shaft 69 in this state. Then, a nut 75 is screwed onto the screw part 74 to fix the magnetic drum 22 onto the rotary shaft 69, so that the magnetic drum 22 rotates unitarily with the rotary shaft 69.

When a current is supplied to the brush 67 through the lead wire 72, the rotary shaft 69 of the motor 24 rotates, and the magnetic drum 22 is rotated at a rotational speed of 60 rps. In this state, the magnetic tube 31 rotates maintaining a substantially perfect tubular surface because of the centrifugal force and the existence of the air film (layer) in the gap g, as already described before.

In a case where a leakage magnetic flux from the motor 24 may possibly introduce undesirable effects on the magnetic tube 31, it is desirable to manufacture the cylindrical body 60 from a material which would provide a magnetic shielding effect. If it is unlikely that the leakage magnetic flux from the motor 24 will introduce undesirable effects on the magnetic tube 31, the cylindrical body 60 may be manufactured from a non-magnetic material such as aluminum or plastics.

Figure 11:
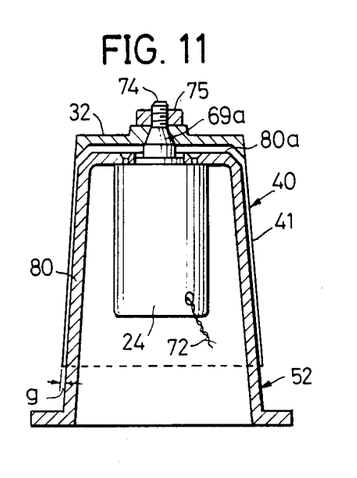
FIG. 11 is an elevation, in vertical cross section, showing a state where the magnetic drum is loaded onto another embodiment of the rotation stabilizing member.

In addition, with respect to the magnetic drum 40 and the rotation stabilizing member 52 shown in FIG. 7, the motor 24 is similarly fixedly supported on a ceiling part 80a of a truncated cone-shaped cylindrical body 80 as shown in FIG. 11. The cylindrical body 80 and the ceiling part 80a respectively constitute the rotation stabilizing member 52. The magnetic drum 40 is mounted on the upper end part 69a of the rotary shaft of the motor 24, as in the previously described embodiment.

Figure 12:
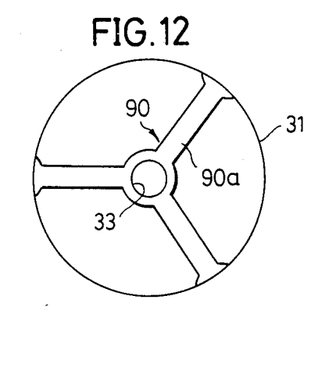
FIG. 12 is a plan view showing another embodiment of a support member for supporting the magnetic tube.

Instead of the disc-shaped end plate 32 which is mounted on the top end of the magnetic tube 31 (31a, 31b, or 41) as the supporting member, a support member 90 shown in FIG. 12 may be used. The support member 90 comprises a plurality of arm parts 90a, and the mounting hole 33 provided at a center thereof. The tip ends of the arm parts 90a are fixedly fitted against the upper inner peripheral surface of the magnetic tube 31, to support the top end of the magnetic tube 31 in a circular shape.

The above magnetic drum alone is difficult to handle, because the magnetic surface of the magnetic tube may come to direct contact with the hands, and dust particles and the like may stick to the magnetic surface. Accordingly, description will now be given with respect to an embodiment wherein the magnetic drum is formed as a cartridge type.

Figure 13:
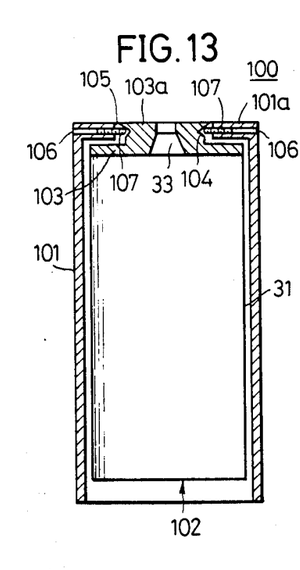
FIG. 13 is a view in vertical cross section showing a first embodiment of a cartridge accommodating the magnetic drum within an accommodating case.

In an embodiment of a cartridge shown in FIG. 13, a cartridge 100 comprises an accommodating case 101, and a magnetic drum 102 accommodated within the case 101. The magnetic drum 102 comprises the magnetic tube 31 and an end plate 103. The end plate 103 comprises a boss part 103a at a center thereof, and the boss part 103a comprises the mounting hole 33. A groove 104 is provided around the periphery of the boss part 103a. The case 101 is of a hollow cylindrical-shape opening at a lower end thereof, and a ceiling part 101a is provided with a hole 105 into which the boss part 103a loosely fits. Screw holes 106 are provided at a plurality of positions on the ceiling part 101a, and screws 107 are screwed in through these screw holes 106. Tip ends of the screws 107 project into the hole 105, and fit within the groove 104 of the boss part 103a.

In a state where the cartridge 100 is not used, the magnetic drum 102 is prevented from being separated from the case 101 by the engagement between the screws 107 and the groove 104. When the rotation stabilizing member 25 shown in FIG. 9 is relatively inserted within the magnetic tube 31 from the lower end opening of the cartridge 100 and the mounting hole 33 is fitted over the upper end part 69a of the rotary shaft of the motor, the screws 107 are within the groove 104 but do not make contact with the boss part 103a. Thus, the screws 107 do not interfere with the rotation of the magnetic drum 102, and the magnetic drum 102 can rotate smoothly.

Figure 14:
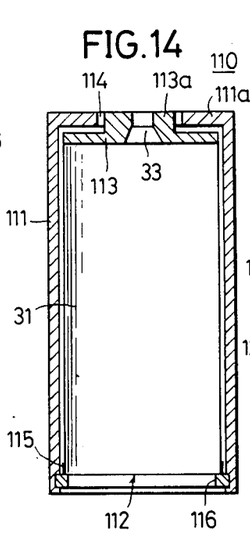
FIG. 14 is a view in vertical cross section showing a second embodiment of a cartridge.

In an embodiment of a cartridge shown in FIG. 14, a cartridge 110 comprises an accommodating case 111, and a magnetic drum 112 accommodated within the case 111. The magnetic drum 112 comprises the magnetic tube 31 and an end plate 113. The end plate 113 comprises a boss part 113a at a center thereof, and the boss part 113a comprises the mounting hole 33. The case 111 is of a hollow cylindrical-shape opening at a lower end thereof, and a ceiling part 111a is provided with a hole 114 into which the boss part 113a loosely fits. A ring 115 is fixed to a lower outer periphery of the magnetic tube 31. Further, a thick ring 116 having an inner diameter smaller than that of the magnetic tube 31, is fixed to the lower inner periphery of the case 111.

In a state where the cartridge 110 is not used, the lower end of the magnetic tube 31 which is reinforced by the ring 115 makes contact with the ring 116, to prevent the magnetic drum 112 from being separated from the case 111. When the rotation stabilizing member 25 shown in FIG. 9 is relatively inserted within the magnetic tube 31 from the lower end opening of the cartridge 110 and the mounting hole 33 is fitted over the upper end part 69a of the rotary shaft of the motor, the lower end of the magnetic tube 31 separates from the ring 116, and the end plate 113 assumes a state where the top surface of the end plate 113 does not make contact with the lower surface of the ceiling part 111a of the case 111. Therefore, the magnetic drum 112 assumes a smoothly rotatable state.

Figure 15:
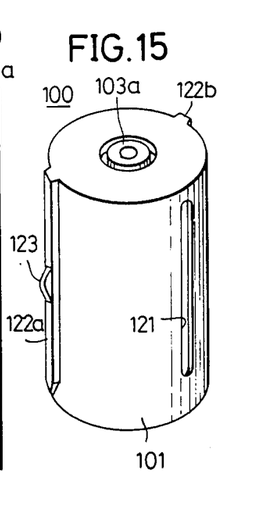
FIGS. 15 and 16 are perspective views respectively showing an embodiment of an external form of a case of the cartridge.
Figure 16:
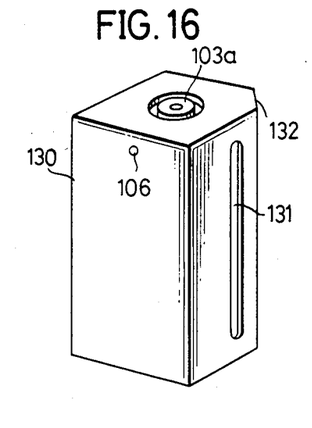

Embodiments of external forms of cases which may have the same inner construction as the case 101 or the case 111, are shown in FIGS. 15 and 16. In the embodiment shown in FIG. 15, a window 121 into which the magnetic head enters, is formed along the longitudinal direction of the case 101, that is, along a direction parallel to the axis of the magnetic drum 102. Ribs 122a and 122b are formed on the outer surface of the case 101, along the longitudinal direction thereof. Springs 123 are provided on the ribs 122a and 122b, so as to stably support the case 101 in the loaded state when the case 101 is loaded onto a case holder, as will be described hereinafter. In order to prevent the cartridge 100 from being loaded on the drive assembly facing the wrong direction, it is desirable to provide the ribs 122a and 122b at positions slightly shifted from diametrical positions. Moreover, it is not essential to provide two ribs, but only one rib may be provided instead.

It is not essential for the case to have a cylindrical-shape as long as the magnetic drum can rotate therein, and a substantially parallelepiped-shaped case 130 shown in FIG. 16 may be used. In this case, a window 131 similar to the above window 121 is provided in the case 130, and a cutout 132 is provided at one corner part of the case 130, for positioning. A case holder of a cartridge loading part which is loaded with a cartridge having the above construction, is formed in a hollow substantially parallelepiped-shape so that the case 130 can be inserted therein.

Figure 17:
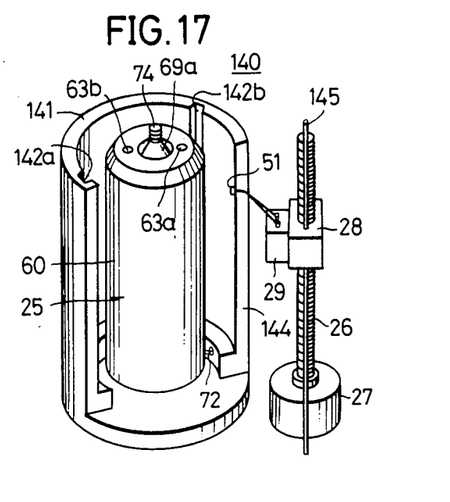
FIG. 17 is a perspective view showing an embodiment of a cartridge loading part onto which the cartridge is loaded.

An embodiment of a cartridge loading part which is loaded with the cartridge, is shown in FIG. 17. In a cartridge loading part 140, the rotation stabilizing member 25 shown in FIG. 9 built-in with the motor 24, is provided at a central part of a hollow cylindrical case holder 141. When loading the cartridge 100 into the cartridge loading part 140, the rotation stabilizing member 25 is relatively inserted within the hollow part of the magnetic drum 102. Moreover, the case 101 is inserted within the case holder 141 in a state where the ribs 122a and 122b on the case 101 engage with guide grooves 12a and 142b of the case holder 141, as the case 101 is inserted within the hollow part of the case holder 141 together with the insertion of the cartridge 100 into the cartridge loading part 140 from above the rotation stabilizing member 25.

Figure 18:
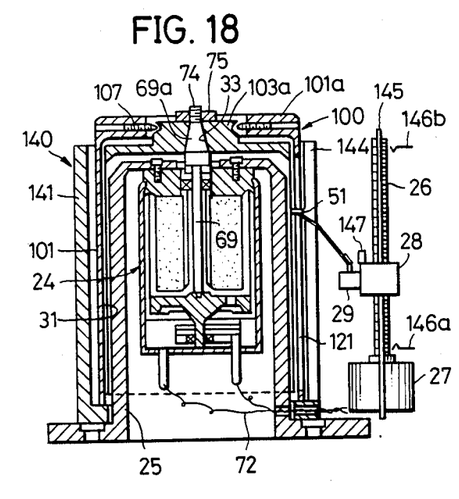
FIG. 18 is a view in vertical cross section showing a state where the cartridge is loaded onto the cartridge loading part shown in FIG. 17.

A part of the case holder 141 is cut out along the longitudinal direction (a direction parallel to the axis) to form a cutout 144, and the magnetic head 51 of the magnetic head device 29 is positioned opposing the cutout 144. The case 101 is always inserted in a direction so that the window 121 opposes the magnetic head 51 through the cutout 144 as shown in FIG. 18, by the positioning provided by the ribs 122a and 122b and the guide grooves 142a and 142b. The magnetic drum 102 of the cartridge 100 which is loaded on the cartridge loading part 140 is rotated by the motor 24. The magnetic head 51 of the magnetic head device 29 is fed continuously or intermittently by the feed screw 26 which is rotated by the motor 27 and the feed nut 28. As a result, an information signal such as the video signal, is recorded and reproduced with respect to the magnetic surface at the outer peripheral surface of the magnetic tube 31 by the magnetic head 51 on spiral or concentric tracks. As the feed screw 26 rotates, the feed nut 28 is prevented from rotation by a guide rod 145, and the feed nut moves linearly in a state guided by the guide rod 145. The moving range of the magnetic head 51 is determined by limit switches 146a and 146b. An actuator 147 is provided on the magnetic head device 29, to cause the magnetic head 51 to make contact with the mgnetic tube 31 or separate the magnetic head 51 from the magnetic tube 31 to recede outside the cartridge 100.

Figure 19:
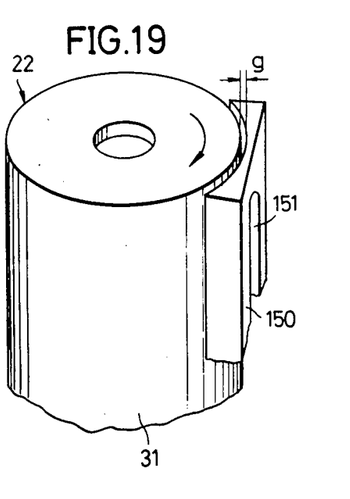
FIG. 19 is a perspective view showing a part of an embodiment provided with a second rotation stabilizing member.

When the magnetic drum 22 is not formed as a cartridge type, a second rotation stabilizing member 150 may be provided opposing the rotation stabilizing member 25 as shown in FIG. 19. The member 150 comprises a window 151 into which the magnetic head 51 enters. In addition, the member 150 comprises an arcuate surface opposing the magnetic tube 31 with a gap g formed therebetween, where this gap g is of the same range as the gap g between the magnetic tube 31 and the rotation stabilizing member 25. An air film is also formed between the rotating magnetic tube 31 and the member 150, to further stabilize the cylindrical surface of the magnetic tube 31.

In each of the above embodiments, the magnetic drum alone, or the cartridge accommodating the magnetic drum within the accommodating case, is loaded onto the rotation stabilizing member 25 which is provided in the apparatus 10 and has the built-in motor 24. Moreover, the magnetic tube of the magnetic drum is designed to rotate stably by forming the air film in the gap g between the magnetic tube and the rotation stabilizing member. For this reason, the rotation stabilizing member of the apparatus must relatively enter within the magnetic tube, and the lower end of the magnetic tube is externally open. Therefore, dust particles and the like may enter within the magnetic tube or between the magnetic tube and the case, and the magnetic tube may become damaged when a finger and the like is inserted within the magnetic tube from the opening at the lower end thereof. Thus, the magnetic drum or the cartridge must be handled with care. Furthermore, although the tapered part 62 is provided on the rotation stabilizing member 25, there is a potential problem in that the magnetic tube may become damaged if the lower end edge of the magnetic tube hits the ceiling part 60a of the rotation stabilizing member 25 during loading of the magnetic tube.

Accordingly, description will hereinafter be given with respect to an embodiment in which the above problems are eliminated. In the embodiment shown in FIGS. 20A and 20B, a cartridge 160 comprises the magnetic drum 22, and an accommodating case 161 for accommodating the magnetic drum 22 therein. The case 161 is of a double-wall construction, and comprises an outer tube 162 and an inner tube 163. The outer tube 162 acts as an outer cover, and comprises a hole 164 in its ceiling part 162a, and a window 165 provided at a side surface thereof into which the magnetic head enters. The inner diameter of the outer tube 162 is set to a value so that a large gap G in the range of 0.4 mm±0.2 mm is formed between the magnetic tube 31 of the magnetic drum 22 and the outer tube 162, when the magnetic tube 31 is positioned at a central position with respect to the outer tube 162.

Figure 20A:
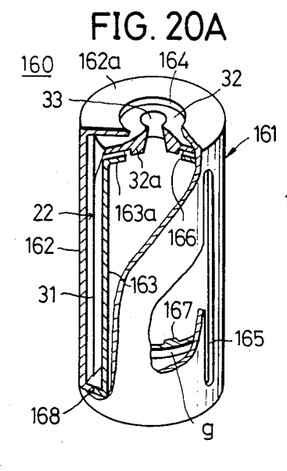
FIGS. 20A and 20B are a perspective view, with a part cut away, and a view in vertical cross section, respectively showing a third embodiment of a cartridge.
Figure 20B:
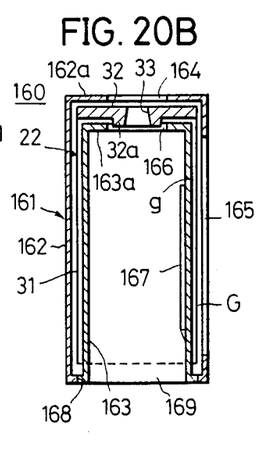

The inner tube 163 acts as a rotation stabilizing member, and comprises a hole 166 in its ceiling part 163a, and a guiding rib 167 provided on the inner peripheral surface thereof. A projection part 32a of the end plate 32 of the magnetic drum 22 loosely fits into the hole 166. Accordingly, the movement of the magnetic drum 22 within the case 161 in the horizontal direction is restricted due to the contact between the side surface of the projecting part 32a and the inner peripheral surface of the hole 166. The outer diameter of the inner tube 163 is set to a value so that a gap g between the magnetic tube 31 and the inner tube 163 is in the range of 70 $\mu$m±30 $\mu$m, when the magnetic tube 31 is positioned at the centeral position. The lower end part of the inner tube 163 and the lower end part of the outer tube 162 meet together at a plane 168 in a state where the magnetic drum 22 is accommodated between the outer and inner tubes 162 and 163, and assume a unitary structure. The outer and inner tubes 162 and 163 are molded from plastics, for example. The gap between the ceiling part 162a of the outer tube 162 and the ceiling part 163a of the inner tube 163 is such that the end plate 32 of the magnetic drum 22 does not make contact with these ceiling parts 162a and 163a when the magnetic drum 22 engages with the rotary shaft of the motor and rotates.

While the magnetic drum 22 is rotated by the motor as will be described hereinafter, the inner tube 163 acts as the rotation stabilizing member by maintaining the gap g with respect to the magnetic tube 31, and the air film is accordingly formed in the gap g. In addition, the magnetic drum 22 is entirely covered by the outer and inner tubes 162 and 163. Hence, even if a finger and the like is inserted within the lower end opening of the case 161, that is, within a lower end opening 169 of the inner tube 163, the finger and the like will not make direct contact with the magnetic tube 31. As a result, the magnetic tube 31 is prevented from being damaged and from becoming contaminated. Therefore, the handling of the cartridge 160 is easy in that special care is not required when handling the cartridge, and further, the magnetic tube will not be damaged when the cartridge is loaded into the apparatus as will be described hereinafter.

Figures 21A, 21B:
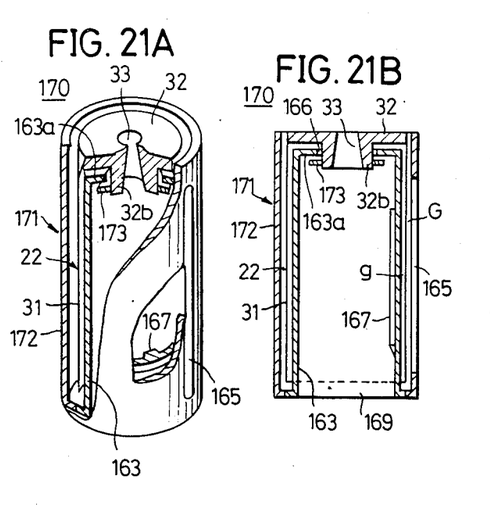
FIGS. 21A and 21B are a perspective view, with a part cut away, and a view in vertical cross section, respectively showing a fourth embodiment of a cartridge.

FIGS. 21A and 21B show another embodiment of a case having the double-wall construction. A cartridge 170 comprises the magnetic drum 22 and an accommodating case 171 for accommodating the magnetic drum 22 therein. The case 171 comprises an outer tube 172 and the inner tube 163. The outer tube 172 comprises a window 165 at the side surface thereof, and does not have a ceiling part. The inner tube 163 has the same construction as in the above described embodiment, and comprises the ceiling part 163a and the rib 167. A projecting part 32b of the end plate 32 of the magnetic drum 22 is loosely fitted into the hole 166 in the ceiling part 163a of the inner tube 163, and projects downwards within the inner tube 163. A stopping ring 173 is fixed to the projecting part 32b. The magnetic drum 22 is thus prevented from slipping upwards outside the case, because the stopping ring 173 will hit against the ceiling 163a of the inner tube 163. According to the description before, the case 170 is constructed from two members, that is, the outer and inner tubes 172 and 163. However, in the present embodiment, the outer and inner tubes 172 and 163 may be formed unitarily from plastics due to their external forms because die cast molding is possible. Hence, when the outer and inner tubes 172 and 173 are formed unitarily, the process of assembling the case becomes unnecessary, and the assembling of the cartridge is facilitated.

Figure 21C:
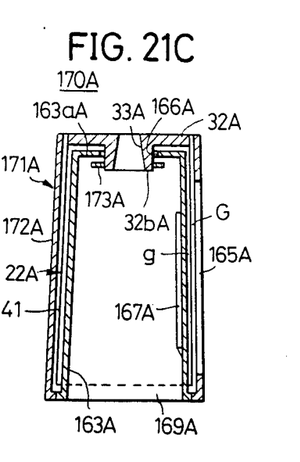
FIG. 21C is a view in vertical cross section showing a modification of the cartridge shown in FIG. 21B.

In the two embodiments having the double-wall construction, the outer and inner tubes of the case respectively are right cylindrical-shape. However, the construction is not limited to the above, and the construction of a modification shown in FIG. 21C may be employed, for example. That is, when the case is obtained by molding plastics, it is easier to extract the molded piece from the mold if the molded piece is truncated cone shape compared to the case where the molded piece is right cylindrical-shape. Accordingly, as shown in FIG. 21C, the outer and inner tubes of the case may be truncated cone shape, and the magnetic tube 41 of the magnetic drum may also be truncated cone shape as the magnetic tube shown in FIG. 7. In FIG. 21C, those parts which correspond to the parts in FIG. 21B are designated by the same reference numerals with a suffix "A", and their description will be omitted. In this modification, a gap between the magnetic tube 41 and an inner tube 163A is equal to the gap g described before.

Figure 22:
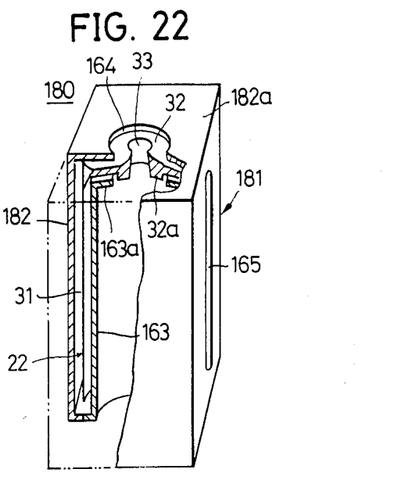
FIG. 22 is a perspective view, with a part cut away, showing a fifth embodiment of a cartridge.

In the two embodiments described heretofore, the outer tube is of a cylindrical-shape, but the outer tube may assume a rectangular tube shape as shown in FIG. 22. In FIG. 22, a case 181 of a cartridge 180 comprises an outer tube 182 and the inner tube 163. The outer tube 182 has a rectangular tube shape, and comprises the window 165 on one side surface thereof, and the hole 164 provided at the center of a ceiling part 182a. The inner tube 163 has a shape identical to those of the embodiment shown in FIGS. 20A and 20B.

Figure 23:
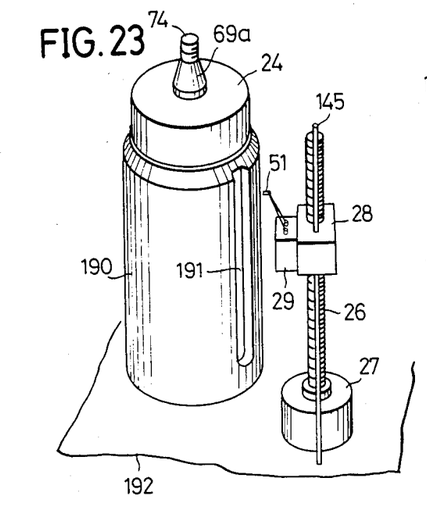
FIG. 23 is a perspective view showing an embodiment of a drive assembly loaded with the third through fifth embodiments of the cartridge.
Figure 24:
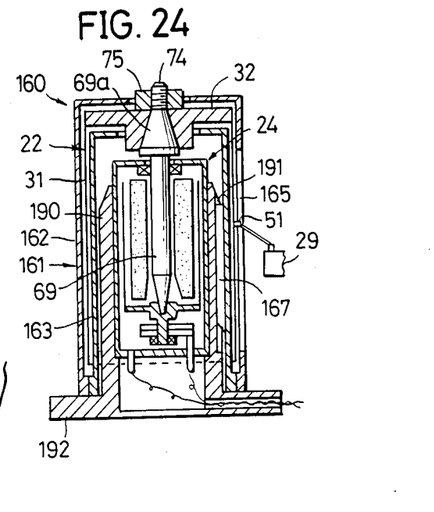
FIG. 24 is a view in vertical cross section showing a state where the cartridge shown in FIGS. 20A and 20B is loaded onto the drive assembly shown in FIG. 23.

An embodiment of a drive assembly provided in the apparatus, which is loaded with the cartridges 160, 170, and 180 shown in FIGS. 20A through 22, is shown in FIGS. 23 and 24. In FIGS. 23 and 24, those parts which are the same as those corresponding parts in FIGS. 17 and 18 are designated by the same reference numerals, and their description will be omitted.

The motor 24 is supported in a state fixedly fitted within a cylindrical-shaped motor holder 190 which is provided on a chassis base 192 in a projecting manner. The holder 190 is provided with a guide groove 191 along a direction parallel to the axis thereof. For example, when loading the cartridge 160 shown in FIGS. 20A and 20B, the motor 24 and the holder 190 are relatively fitted within the inner tube 163 from the lower end opening 169 of the cartridge 160, and the magnetic drum 22 and the case 161 are loaded from above the motor 24 and the holder 190. The loading of the cartridge 160 is carried out in a state where the rib 167 of the inner tube 163 engages with and is guided by the guide groove 191. Due to the engagement between the rib 167 and the guide groove 191, the cartridge 160 is loaded facing a direction such that the window 165 opposes the magnetic head 51. The end plate 32 of the magnetic drum 22 is clamped between the upper end part 69a of the rotary shaft 69 of the motor and the nut 75, and the magnetic drum 22 is rotated as the rotary shaft 69 of the motor rotates. In this state, the magnetic tube 31 rotates maintaining a substantially perfect cylindrical surface due to the centrifugal force. In addition, because of the air film formed in the gap between the magnetic tube 31 and the inner tube 163, surface oscillation is not introduced in the cylindrical surface of the magnetic tube 31 even when the magnetic head 51 makes contact with the magnetic tube 31, and the recording and reproduction can be carried out satisfactorily.

In the embodiments described before having the double-wall construction, the magnetic tube 31 is of a right cylindrical-shape, but the magnetic tube 31 may assume a truncated cone shape as shown in FIGS. 7 and 11. In these cases, at least the inner tube is formed in the shape of a truncated cone, and the motor holder is also formed in the shape of a truncated cone. Further, the feed screw 26 and the guide rod 145 are inclined with respect to a an imaginary line perpendicular to the chassis base, so that the feed screw 26 and the guide rod 145 become parallel to the magnetic surface of the magnetic tube.

In each of the above described embodiments, the magnetic surface is formed on the outer peripheral surface of the magnetic tube. However, the magnetic surface may be formed on only the inner peripheral surface of the magnetic tube or on both the outer and inner peripheral surfaces of the magnetic tube. A cartridge in which the magnetic surface is formed on the inner peripheral surface of the magnetic tube, and a drive assembly which is loaded with such a cartridge, will be described by referring to FIGS. 25 and 26.

Figure 25:
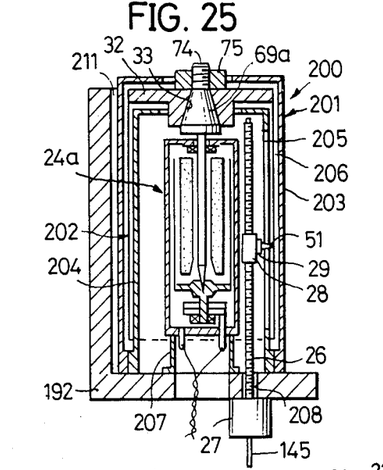
FIG. 25 is a view in vertical cross section showing a sixth embodiment of a cartridge together with another embodiment of a drive assembly.

A cartridge 200 comprises a case 201 and a magnetic drum 202. The case 201 comprises an outer tube 203, and an inner tube 204 which is provided with a window 205. The magnetic drum 202 comprises the end plate 32, and a magnetic tube 206 which is formed with a magnetic surface on the inner peripheral surface thereof. The size of the outer tube 203 is determined so that a gap between the magnetic tube 206 and the outer tube 203 is the same as the gap g described previously.

Figure 26:
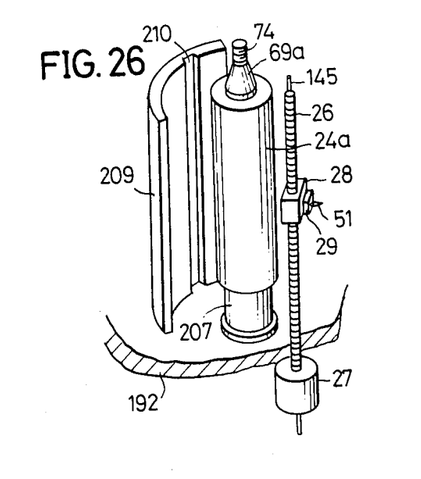
FIG. 26 is a perspective view showing the drive assembly shown in FIG. 25.

A motor 24a is supported on a support 207 which is provided on the chassis base 192, and the diameter of the motor 24a is smaller than that of the motor 24 described before. The motor 27 is provided below the chassis base 192, and the feed screw 26 penetrates and projects upwards through a hole 208 in the chassis base 192. The magnetic head 51 is facing outward with the back thereof against the motor 24a. A case holder 209 which has a partially cylindrical-shape, is provided at a position apart from the motor 24a by a predetermined distance. A guide groove 210 is provided in the inner peripheral surface of the case holder 209, along the longitudinal direction thereof.

The motor 24a, feed screw 26, guide rod 145, feed nut 28, magnetic head device 29, magnetic head 51, and the like, are relatively inserted within the inner tube 204 while engaging a rib 211 formed on the outer side of the outer tube 203 of the cartridge case 201 with the guide groove 210 of the case holder 209, to load the cartridge 200 as shown in FIG. 25. In this state, the magnetic head 51 opposes the window 205 of the inner tube 204, and upon recording and reproduction, the magnetic head 51 makes contact with the inner peripheral surface of the magnetic tube 206 through the window 205.

Figure 27:
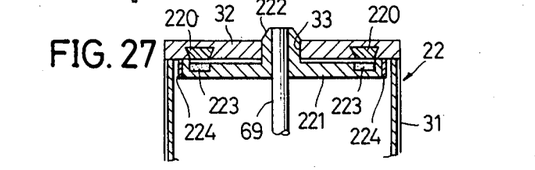
FIG. 27 is a view in vertical cross section showing another embodiment of an engaging mechanism for engaging the magnetic drum with the rotary shaft of the motor.

Further, in the embodiments described heretofore, the mounting of the magnetic drum with respect to the rotary shaft of the motor was achieved by the screwing of the nut 75 over the screw 74, but the construction shown in FIG. 27 may be employed instead. In FIG. 27, a connecting plate 220 made of a soft magnetic material and having a ring-shape, is embeddedly provided on the lower surface of the end plate 32 of the magnetic drum 22. A rotary support plate 221 is fixed to the upper part of the rotary shaft 69 of the motor. A projection 222 which fits into the hole 33 in the end plate 32, is unitarily provided at the center of the rotary support plate 221. A permanent magnet 223 is embeddedly provided on the upper surface of the rotary support plate 221, and a ring 224 made of a ferromagnetic material is provided around the peripheral surface of the rotary support plate 221 for shielding the leakage magnetic flux from the permanent magnet 223. A depression is formed at the upper surface of the rotary support plate 221, excluding the outer peripheral edge and the central projection 222 of the rotary support plate 221. The end plate 32 is supported by the outer peripheral edge of the rotary support plate 221.

According to the present embodiment, the connecting plate 220 is attracted by the permanent magnet 223, and the end plate 32 is placed and fixed onto the rotary support plate 221. Accordingly, the engagement between the magnetic drum 22 and the rotary shaft 69 of the motor is facilitated, and there is no need for an operation to screw the nut 75 and the like. In addition, instead of providing the hole 33, a depression may be provided at the lower central surface of the end plate 32 so that the upper part of the rotary shaft 69 engages with this depression.

Figure 28:
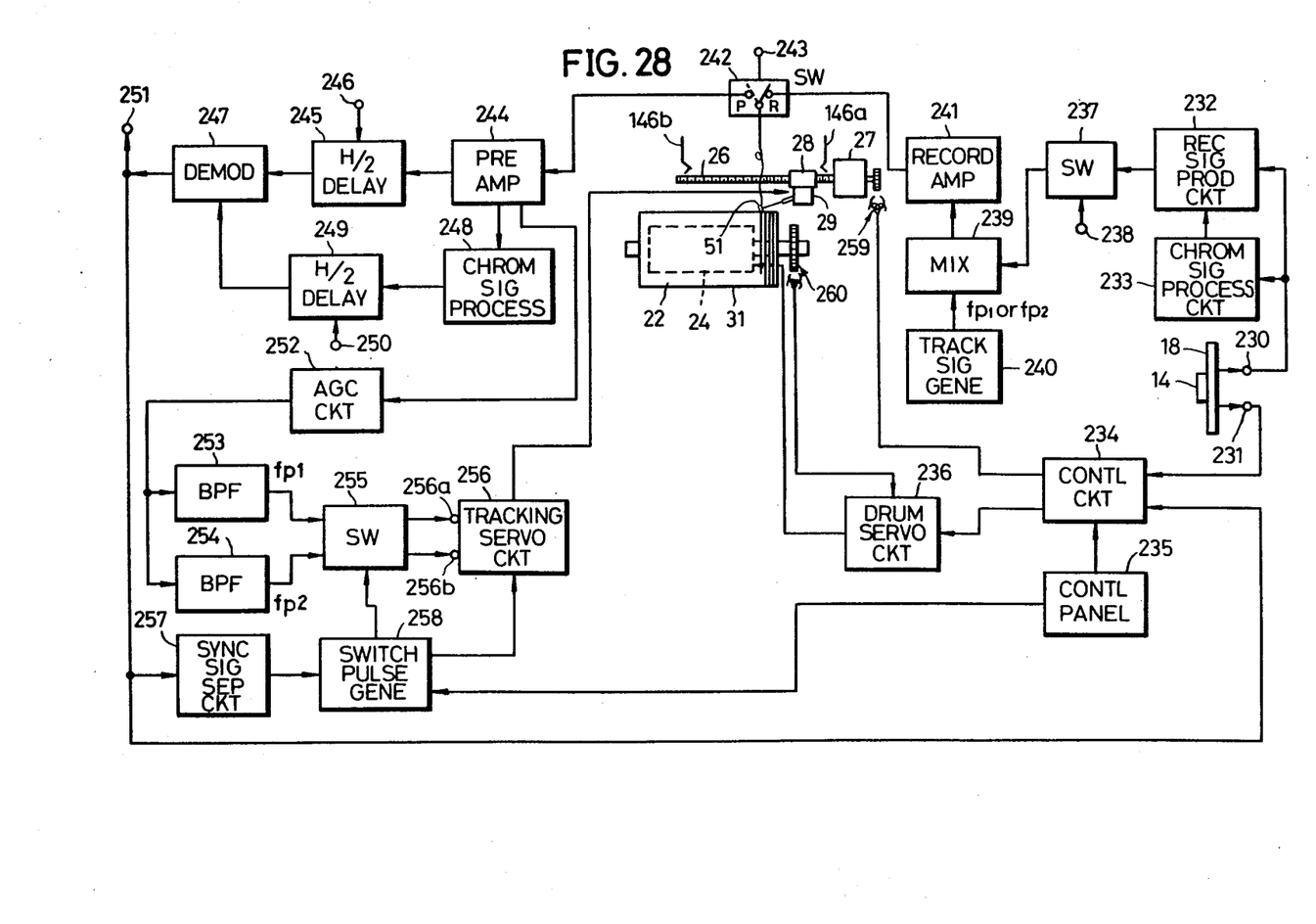
FIG. 28 is a systematic block diagram showing an embodiment of a circuit system of the apparatus shown in FIG. 1.

Next, general description will be given with respect to the operation of the apparatus 10 with reference to FIG. 28. The operation of the apparatus 10 is essentially the same as the operation of the apparatus previously proposed by the present inventor.

A color video signal which is picked up by the solid-state image pickup element 14 and produced from the circuit including the printed circuit 18, is supplied to a recording signal producing circuit 232 and a chrominance signal processing circuit 233 from an output terminal 230. Similarly, a synchronizing signal generated by the above circuit is supplied to a control circuit 234 through an output terminal 231. A control panel 235 is an operation panel including the operation switch 21 for setting the operation mode. An output of the control panel 235 is supplied to the control circuit 234. The control circuit 234 causes the motor 24 which drives the magnetic drum 22 to undergo synchronous rotation at the rotational speed of 3600 rpm as described before, through a drum servo circuit 236.

The carrier chrominance signal within the above color video signal thus picked up, is frequency-converted into a low-band-converted carrier chrominance signal having a subcarrier frequency $f_{sc}$ (629 kHz, for example) at the chrominance signal processing circuit 233. The resulting low-band-converted carrier chrominance signal is then supplied to the recording signal producing circuit 232. The recording signal producing circuit 232 separates the luminance signal within the above color video signal, and frequency-modulates a carrier with the separated luminance signal. The frequency-modulated carrier luminance signal is subjected to frequency-division multiplexing with the low-band-converted carrier chrominance signal from the chrominance signal processing circuit 233, and produces a recording information signal. It is possible to also record an audio signal. In this case, an audio signal of the sound picked up by a microphone (not shown) of the apparatus 10 shown in FIG. 1 is frequency-modulated to occupy a band which does not overlap with that of the above signal.

The above recording information signal is supplied to a switching circuit 237. The recording information signal is passed through the switching circuit 237 only during even field periods and blocked during odd field periods, for example, that is, the recording information signal is only passed through during either one of the odd and even field periods, by a switching pulse having a 1-field of positive period which is obtained through an input terminal 238. As a result, only the recording information signal of the even field period is passed from the switching circuit 237 during every other field period (that is, a so-called field-skip is performed), and supplied to a mixer 239. An output of a flip-flop (not shown) triggered by a vertical synchronizing pulse which is separated from the input color video signal, may be used as the above switching pulse.

A tracking signal generator 240 generates first and second tracking control reference signals (hereinafter simply referred to as tracking signals) fp1 and fp2 which exist within the band of the above low-band-converted carrier chrominance signal and have mutually different frequencies. A set of gate pulses respectively having a repetition frequency of 30 Hz, which is a half of that of the above switching pulse, of which the positive polarity period is a 1-field period in phase synchronism with the negative polarity period of the above switching pulse, and the relative phases of the two gate pulses differ by 2-field period in time, are generated by a circuit within the tracking signal generator 240. As a result, the first tracking signal fp1 and the second tracking signal fp2 are alternately supplied to the mixer 239 according to the generated gate pulse.

In the present embodiment, in order to prevent beat interference with respect to the recording information signal in the recording and reproducing system and carry out the recording and reproduction at a suitable level with a high signal-to-noise (S/N) ratio, the tracking signals fp1 and fp2 are generated by the switching pulses in a form of tone burst existing only within intervals corresponding to horizontal blanking periods avoiding the video period and the color burst period of the input color video signal. In addition, the first and second tracking signals fp1 and fp2 are generated for every second 1H (H indicates a horizontal scanning period) for a 2H period, for reasons which will be described hereinafter. Furthermore, two kinds of tracking signals fp1 and fp2 are recorded on adjacent tracks having therebetween one information signals recording track as a recording track pattern, with 1H shift in staggering manner.

Accordingly, only the first tracking signal fp1 is produced from the mixer 239 in a burst manner during a certain field (for example, odd field) period and a frequency-division multiplexed recorded signal FM (Fe1) of a subsequent field (even field) period is produced during that subsequent field period. Further, during a succeeding odd field period, only the second tracking signal fp2 is produced in a burst manner, and during a subsequent even field period, a recorded signal FM (Fe2) of that subsequent even field is produced. Thus, a time-sequential multiplexed signal is obtained by similarly repeating the above described production of signals. The time-sequential multiplexed signal is amplified to a suitable level at a recording amplifier 241. The amplified signal from the recording amplifier 241 is supplied to the magnetic head 51 through a terminal R of switching circuit 242 which is commanded by a recording mode signal fed through a terminal 243. The signal hence supplied to the magnetic head 51 is recorded on the spiral or concentric track formed on the magnetic tube 31 of the magnetic drum 22.

During the reproduction, the switching circuit 242 is held to a terminal P commanded by a reproduction mode signal from the terminal 243. The magnetic head 51 reproduces the information signal from recording tracks on the magnetic tube 31. Because the track pitch TP is smaller than the track width TW, three kinds of signals, that is, the information signal and the first and second tracking signals fp1 and fp2 from the adjacent tracks on both sides of the intended reproducing track, are reproduced simultaneously. The reproduced signal passes through the switching circuit 242 and is amplified to a suitable level at a preamplifier 244. The amplified signal is supplied to a H/2-delay circuit 245, a chrominance signal processing circuit 248, and an automatic gain control (AGC) circuit 252. The chrominance signal processing circuit 248 separates and filters the low-band-converted carrier chrominance signal from within the reproduced signal, and frequency-converts the low-band-converted carrier chrominance signal back into its original band to obtain a reproduced carrier chrominance signal. This reproduced carrier chrominance signal is supplied to a demodulating circuit 247 through a H/2-delay circuit 249.

The demodulating circuit 247 frequency-demodulates the frequency-modulated luminance signal from within the reproduced signal from the delay circuit 245. The demodulated luminance signal is multiplexed with the reproduced carrier chrominance signal from the delay circuit 249. As a result, a color television signal in accordance with the standard television system is produced. The output signal of the demodulating circuit 247 is fed to an output terminal 251, and is also supplied to a synchronizing signal separating circuit 257 and the control circuit 234. The vertical synchronizing pulse separated at the synchronizing signal separating circuit 257 is supplied to a switching pulse generator 258, and used as a reference when generating the switching pulse.

The delay circuits 245 and 249 repeat operations in which the input signal is delayed by H/2 for a certain field and not delayed for a field succeeding that certain field, in response to respective control signals fed from terminals 246 and 250. Because the video signal which is recorded and reproduced is a video signal of every second fields, that is, a video signal of either one of the odd or even fields, the above delay of H/2 for every second field is necessary to achieve an interlace.

The level deviation in the signal from the preamplifier 244 due to causes other than the track shift, is controlled to become constant at the AGC circuit 252. The output of the AGC circuit 252 is supplied to bandpass filters 253 and 254 wherein the first and second tracking signals fp1 and fp2 within the reproduced signal are respectively separated. Outputs of the above bandpass filters 253 and 254 are supplied to a switching circuit 255. The switching circuit 255 is switched by the switching pulse from the switching pulse generator 258, and alternately supplies the first and second tracking signals fp1 and fp2 to input terminals 256a and 256b of a tracking servo circuit 256. The switching circuit 255 does not perform switching during a slow-motion reproduction mode, and performs the switching only during the normal speed reproduction for every one revolution of the magnetic drum 22. The tracking servo circuit 256 detects envelopes of the tracking signals fp1 and fp2, and produces a tracking error signal through a differential amplifier. The tracking error signal is converted into a predetermined driving voltage, and supplied to the magnetic head device 29. Accordingly, the magnetic head 51 is controllably displaced along the track width direction of the recording track, and the tracking control is performed so that the tracking signals fp1 and fp2 are constantly reproduced with equal and the same constant reproducing level, that is, so that the level of the FM signal within the reproduced information signal is maintained constantly maximum.

A detection output of a rotation detecting mechanism 259 of the motor 27 is supplied to the control circuit 234, while a detection output of a rotation detecting mechanism 260 of the motor 24 is supplied to the drum servo circuit 236.

In each of the embodiments described heretofore, the magnetic tube of the recording medium according to the present invention comprises the thin and flexible magnetic film or magnetic sheet and the like. For this reason, the recording medium can be manufactured with ease at low cost. Moreover, stable and satisfactory recording and reproduction can be carried out, because a substantially perfect cylindrical recording surface can be obtained when the recording medium is rotated. Therefore, there is no need to form or finish the outer peripheral surface of the main body of the hard magnetic drum as in the recording medium previously proposed by the present inventor, and the cost of the recording medium is reduced since there is no need to subject the outer peripheral surface to a forming or finishing process.

In addition, in each of the previously described embodiments, when the magnetic tube is of a right cylindrical-shape, it is desirable for the rotation stabilizing member to have a right cylindrical shape, and the gap g between the magnetic tube and the rotation stabilizing member to be constant for the full length of the magnetic tube. However, if the rotation stabilizing member is molded from plastics, it becomes difficult to form the right cylindrical-shape by die cast molding, and there is a need to form the rotation stabilizing member as a truncated cone shape having a slight slope at the side surface thereof. In this case, a gap between the magnetic tube and the rotation stabilizing member would be smaller at the skirt thereof but bigger at the top relatively. However, because the top part of the magnetic tube which is closer to the end plate is more unlikely to loose the cylindrical shape because of the restricting effect of the end plate, no problems will be introduced even if the above truncated cone shaped rotation stabilizing member is employed.

Moreover, the information recorded and reproduced with respect to the magnetic drum is not limited to the video signal, but may be a pulse code modulated (PCM) audio signal, for example. In addition, the recording medium of the present invention may be employed as a terminal memory of a computer in place of the existing floppy disc.

Further, the present invention is not limited to these embodiments, but various variations and modifications may be made without departing from the scope of the present invention.

What is claimed is:

1. A recording medium designed to operate with a recording and/or reproducing apparatus comprising a rotational motor having a rotary shaft and recording and/or reproducing means, said recording medium comprising: a main body comprising a flexible recording carrier in the form of a sheet or film, said recording carrier having a hollow cylindrical-shape which is open at one end thereof and comprising a recording surface around a peripheral surface thereof and a hollow interior with a surface which is parallel to the peripheral surface; and a support member fixedly supporting the other end of said main body so as to maintain a circular shape therefor, said support member having a central hole for detachably engaging with the rotary shaft of said motor to provide axial and radial positioning of said main body with respect to said rotary shaft, said recording medium being rotated by said motor while maintaining a predetermined minute gap between said main body and a rotation stabilizing member which has a cylindrical surface substantially parallel to said main body, said cylindrical surface extending in an axial direction of said main body, said rotation stabilizing member being provided in said recording and/or reproducing apparatus, said motor being provided within said rotation stabilizing member and a tip end of said rotary shaft of said motor projects from said rotation stabilizing member as an engaging part, said central hole of said support member engaging with said engaging part in a state in which said motor and said rotation stabilizing member are disposed within the hollow interior of said main body.

2. A recording medium as claimed in claim 1 in which said gap is selected to a value so that an air film is formed between said main body and said rotation stabilizing member upon rotation of said recording medium.

3. A recording medium as claimed in claim 2 in which said value of said gap is selected to a value in a range of 10 μm to 200 μm.

4. A recording medium as claimed in claim 1 in which said main body comprises a recording carrier in the form of a seamless tube.

5. A recording medium as claimed in claim 1 in which said main body in the form of the sheet or film is bent in the form of a tube and both end edges thereof are joined together.

6. A recording medium as claimed in claim 1 in which said main body comprises the recording surface on an outer peripheral surface thereof.

7. A recording medium as claimed in claim 1 in which said support member comprises a disc-shaped member having a central part provided with said central hole and a peripheral part for being fixed to the other end of said main body.

8. A recording medium as claimed in claim 1 in which said support member comprises a central part provided with said central hole, and arm parts each having an end thereof fixed to the other end of said main body, said arm parts extending radially between said central part and said other end of said main body.

9. A recording medium operative with a recording and/or reproducing apparatus comprising a rotational motor and recording and/or reproducing means, said recording medium comprising:

a main body comprising a flexible recording carrier in the form of a sheet or film, said recording carrier having a hollow cylindrical-shape opening at one end thereof and comprising a recording surface around a peripheral surface thereof and a hollow interior with a surface which is parallel to the peripheral surface; and a support member for supporting the other end of said main body so as to maintain a circular shape, said support member being engageable with said motor, said recording medium being accommodated within an accommodating case to assume a form of a cartridge and being rotated by said motor while maintaining a predetermined minute gap between said main body and a rotation stabilizing manner which has a cylindrical surface substantially parallel to said main body.

10. A recording medium as claimed in claim 9 which is loaded into said recording and/or reproducing apparatus together with said accommodating case.

11. A recording medium as claimed in claim 9 in which said accommodating case comprises a preventing mechanism for preventing said recording medium from escaping from said accommodating case.

12. A recording medium as claimed in claim 9 in which recording and/or reproducing means comprises a recording and/or reproducing transducer, and said accommodating case comprises a window into which said recording and/or reproducing transducer enters.

13. A recording medium as claimed in claim 9 in which said accommodating case comprises a hollow outer tube part covering an outer side of said main body and a hollow inner tube part for covering an inner side of said main body, and at least one of said outer and inner tube parts forms said gap with respect to said main body to constitute said rotation stabilizing member.

14. A recording medium as claimed in claim 13 in which said main body comprises the recording surface on an outer peripheral surface thereof, and the inner tube part of said accommodating case forms said gap with respect to an inner peripheral surface of said main body to function as said rotation stabilizing member.

15. A recording medium as claimed in claim 13 in which said accommodating case is constituted of said outer and inner tube parts which are formed independently and connected together.

16. A recording medium as claimed in claim 13 in which said accommodating case is constituted of said outer and inner tube parts which are unitarily molded from plastics.

17. A recording medium as claimed in claim 13 in which said main body comprises the recording surface on an inner peripheral surface thereof, the outer tube part of said accommodating case forms said gap with respect to an outer peripheral surface of said main body to function as said rotation stabilizing member, said recording and reproducing means comprises a recording and/or reproducing transducer, said inner tube part is fitted with said motor and said recording and/or reproducing transducer within a hollow part thereof, and said inner tube part comprises a window through which said recording and/or reproducing transducer enters.

18. A recording medium as claimed in claim 1 comprising magnetic means for drivingly coupling said support member and the rotary shaft when the shaft is engaged with said central hole.

* * * * *